(12) United States Patent
Kubert

(10) Patent No.: US 6,199,757 B1
(45) Date of Patent: Mar. 13, 2001

(54) DEBIT CARD HAVING SCRATCH-OFF LABEL STRIP AND METHOD OF APPLYING SAME

(75) Inventor: Vincent Kubert, Melbourne, FL (US)

(73) Assignee: Profold, Inc., Sebastian, FL (US)

(*) Notice: Subject to any disclaimer, the term of this patent is extended or adjusted under 35 U.S.C. 154(b) by 0 days.

(21) Appl. No.: 09/496,096

(22) Filed: Feb. 1, 2000

(51) Int. Cl.$^7$ ...................................................... G06K 5/00
(52) U.S. Cl. ........................... 235/380; 235/375; 235/487
(58) Field of Search .................................. 235/380, 487, 235/375; 379/144

(56) References Cited

U.S. PATENT DOCUMENTS

| | | |
|---|---|---|
| 2,145,334 | 1/1939 | Bergstein . |
| 2,781,818 | 2/1957 | Beckman et al. . |
| 3,966,193 | 6/1976 | Storace et al. . |
| 4,119,194 | 10/1978 | Freeman et al. . |
| 4,121,403 | 10/1978 | Bogdanski et al. . |
| 4,140,627 | 2/1979 | Weller et al. . |
| 4,183,779 | 1/1980 | Barber et al. . |
| 4,278,488 | 7/1981 | Kopacz et al. . |
| 4,588,463 | 5/1986 | Barber et al. . |
| 4,606,715 | 8/1986 | Larson . |
| 4,621,798 | 11/1986 | Akers . |
| 4,669,719 | 6/1987 | Frantangelo . |
| 4,701,238 | 10/1987 | Boucher . |
| 4,750,966 | 6/1988 | Koller . |
| 4,795,042 | 1/1989 | Klein et al. . |
| 4,930,764 | 6/1990 | Holbrook et al. . |
| 4,955,483 | 9/1990 | O'Dea et al. . |
| 4,971,686 | 11/1990 | O'Dea et al. . |
| 4,973,037 | 11/1990 | Holbrook . |
| 5,114,137 | 5/1992 | Olson . |
| 5,214,901 | 6/1993 | Milliner . |
| 5,294,100 | 3/1994 | Scheibelhut . |
| 5,393,366 | 2/1995 | Bell . |
| 5,398,922 | 3/1995 | Malatesta . |
| 5,595,044 | 1/1997 | Kataigi . |
| 5,629,977 | 5/1997 | Fonseca . |
| 5,630,899 | 5/1997 | Meschi . |
| 5,640,447 | 6/1997 | Fonseca . |
| 5,673,309 | 9/1997 | Woynoski et al. . |
| 5,891,300 | 4/1999 | Oussani, Jr. et al. . |
| 5,918,909 | 7/1999 | Fiala et al. . |
| 6,028,920 | * 2/2000 | Carson ................................ 235/380 |

* cited by examiner

Primary Examiner—Harold I. Pitts
(74) Attorney, Agent, or Firm—Allen, Dyer, Doppelt, Milbrath & Gilchrist, P.A.

(57) ABSTRACT

A debit card in the form of a telephone calling card is formed as a rectangular configured, planar card member that is wallet sized and has front and rear surfaces. The rear surface includes instructions for telephone dialing. A scratch-off label strip has been adhered to the rear surface. The scratch-off label strip has opposing sides and one side has a self-adhesive positioned thereon that removably adheres to scratch-off label onto the planar card member. The other side has a PIN code field containing a printed PIN (personal identification number) thereon. A control code field is positioned adjacent the PIN code field and has a control code printed thereon. A scratch-off layer covers only the PIN code field to obscure from view the PIN while leaving unobscured the control code field.

34 Claims, 13 Drawing Sheets

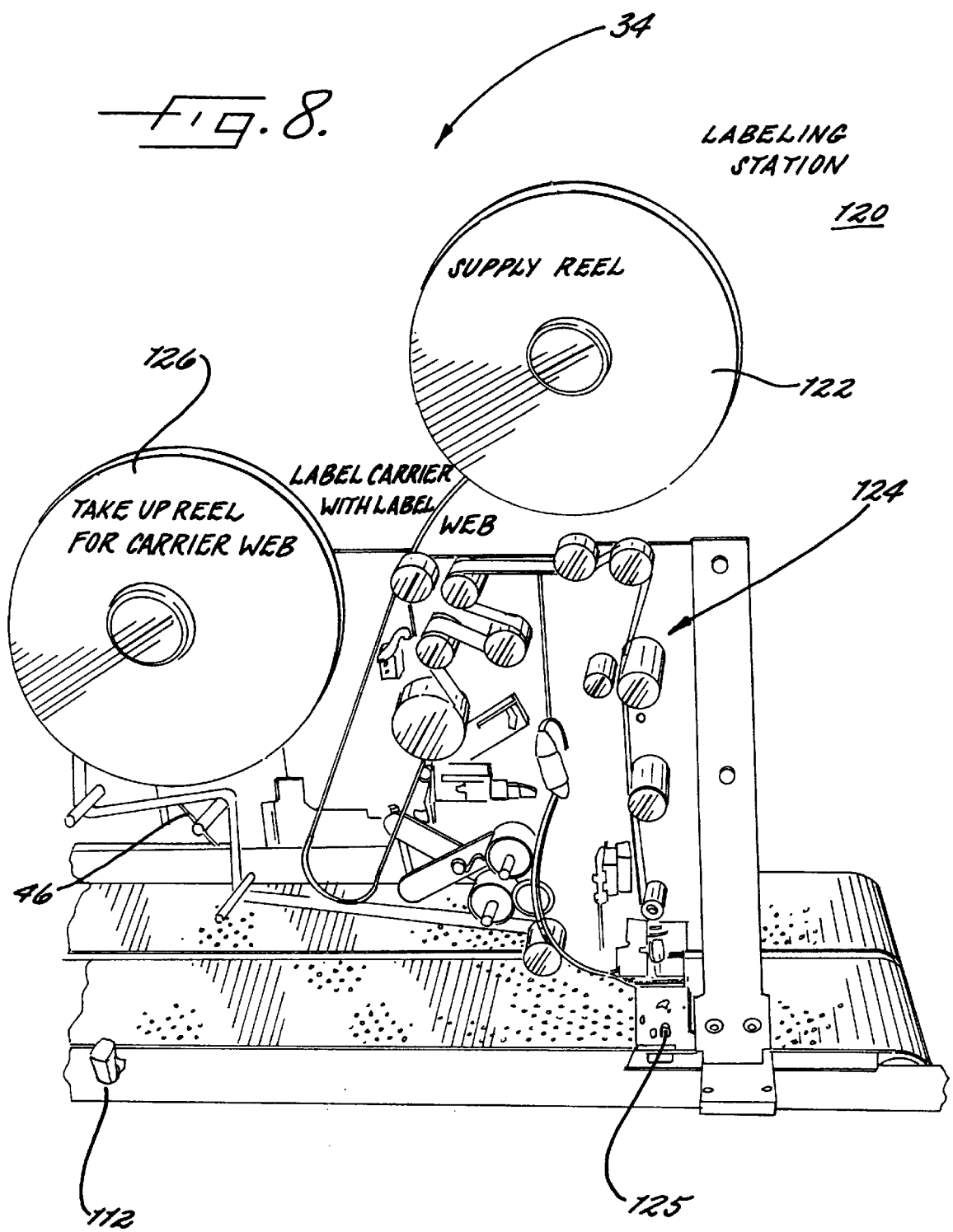

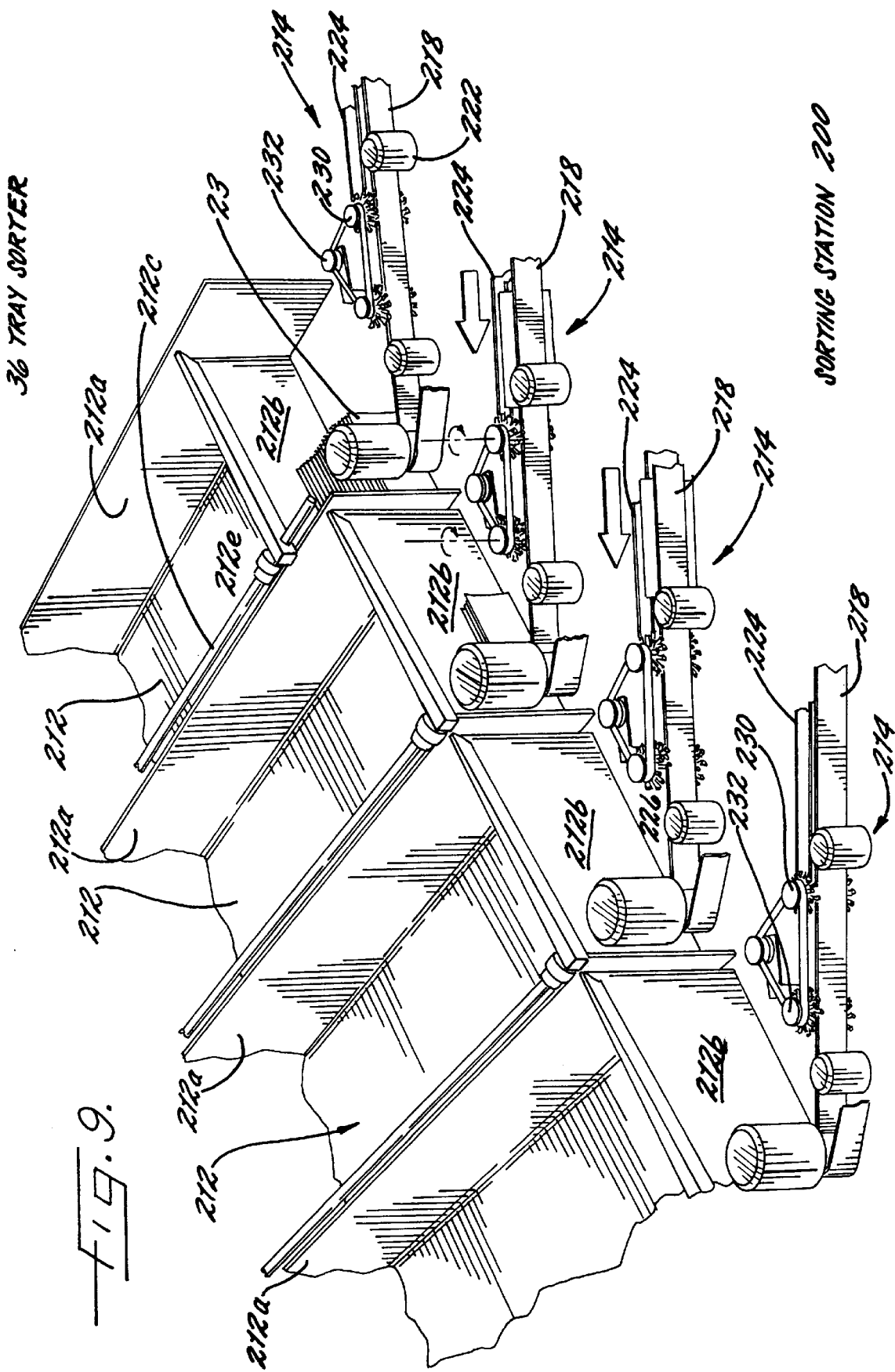

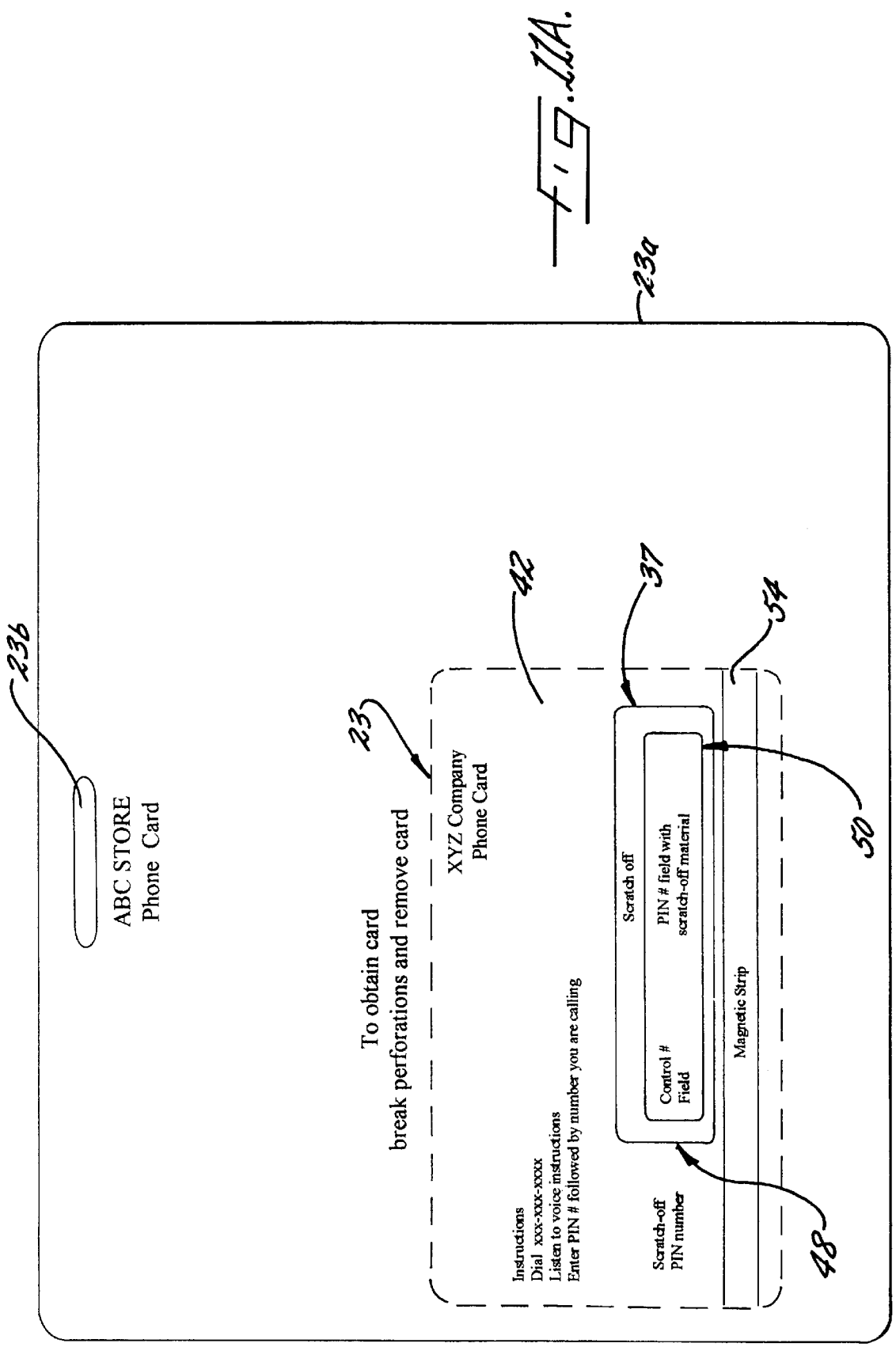

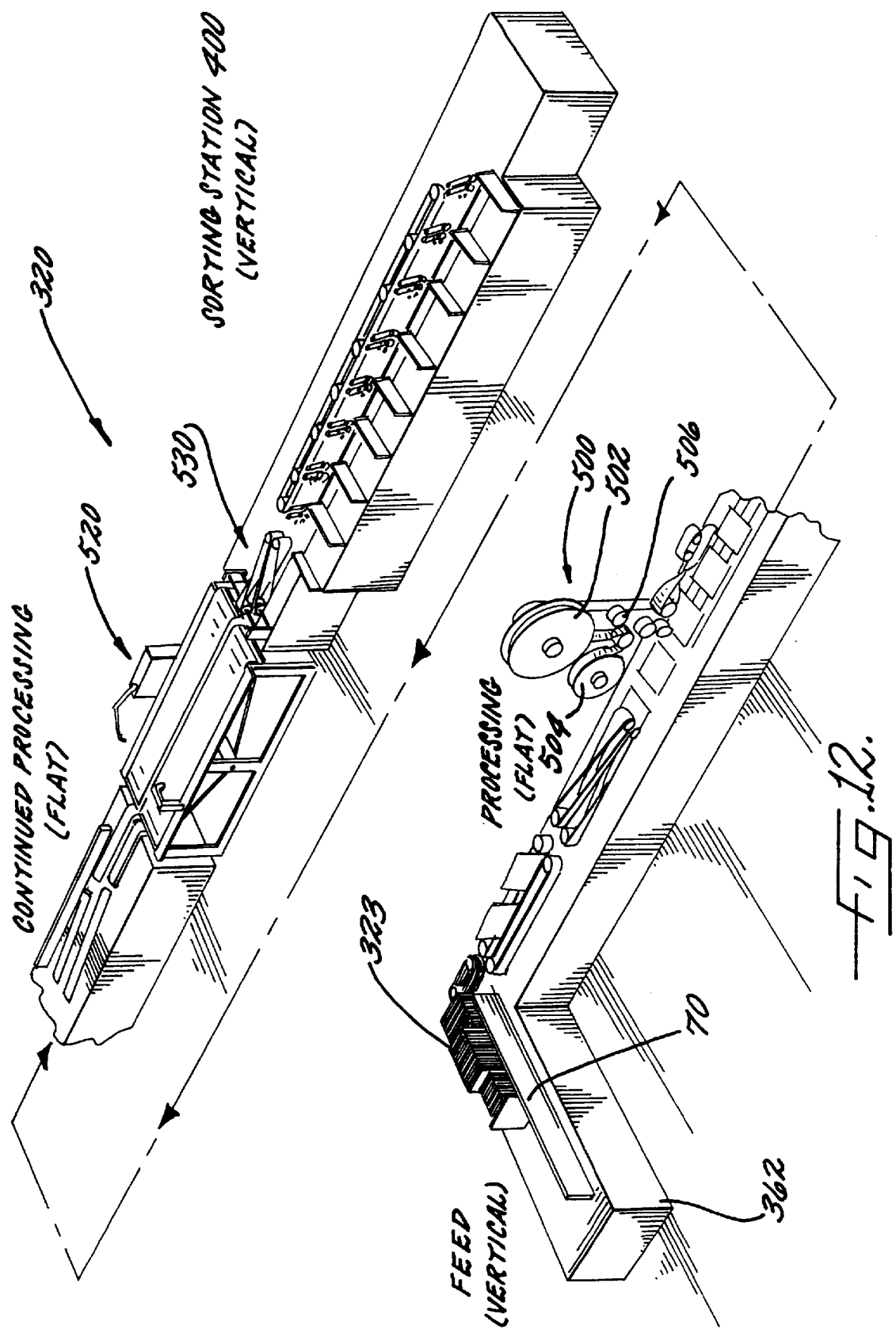

DEBIT CARD HAVING SCRATCH-OFF LABEL STRIP AND METHOD OF APPLYING SAME

FIELD OF THE INVENTION

This invention relates to the field of labeling, and more particularly, this invention relates to the field of automatically applying labels onto cards.

BACKGROUND OF THE INVENTION

Debit cards in the form of a wallet sized phone card have become common place in Europe, the United States and especially Latin America because the purchaser of the phone card does not have to establish a special account with the phone company or other telephone service provider. As is well known, the phone card has a personal identification number (PIN), usually printed on the phone card. A scratch-off paint or other coating is typically sprayed or applied by other means onto the printed PIN to cover the PIN. In the most simple type of card, the user purchases the card and scratches off the coating to reveal the PIN contained on the card. The user dials a long distance telephone number belonging to the card issuer and then dials the PIN number contained on the card. The account balance is verified and a call to a desired location completed by having the user dial a long distance telephone company. The phone card account balance is then charged.

In other types of cards, a magnetic strip can be applied onto the phone card to allow replenishing of the phone card via a credit card or other means if insufficient funds are still contained on the phone card. A control number often is established with the card to allow replenishing. Often with phone cards, they must be processed in an automated manner very quickly. The PIN number is typically printed on the card, together with a control number either adjacent to the PIN number or located somewhere else on the card. Thus, either one or two printing steps onto the card are required, and then a separate coding step required to cover the printed PIN. Additionally, if the control code is located adjacent the PIN, then the control number could be accidentally covered under high speed operating conditions.

SUMMARY OF THE INVENTION

It is therefore an object of the present invention to provide a debit card and associated method of applying a PIN and control code onto a debit card in an efficient manner without the drawbacks of the prior art.

In accordance with the present invention, a debit card comprises a rectangular configured, planar card member that is wallet sized and has front and rear surfaces. The phone card can be processed as part of a planar card carrier member, which is then cut out or removed, such as by breaking perforations that hold the phone card to the card carrier member. In one aspect of the invention, a data encoded strip is positioned on the rear surface of the card. A scratch-off label is adhered to the rear surface and has opposing sides. One side has a self-adhesive positioned thereon that removably adheres the scratch-off label onto the planar card member. The other side has a PIN code field containing a printed PIN (personal identification number) thereon. A control code field is positioned adjacent the PIN code field and has a control code printed thereon. A scratch-off layer covers only the PIN code field to obscure from viewing the PIN while leaving exposed the control code field and any control code printed thereon.

In still another aspect of the present invention, a data encoded strip is formed as a magnetic strip. The data encoded strip could be formed as a label stripe that has been applied in an automated labeling process. The scratch-off label strip could include a base label layer that has been removed from a carrier web during an automated labeling process. The control code can comprise a two-dimensional bar code and the control code could comprise a regular bar code. In still another aspect of the present invention, the control code can comprise an array of dots. The debit card could be a credit card or telephone calling card.

In yet another aspect of the present invention, the telephone calling card includes a rectangular configured, planar card member that is wallet sized and has front and rear surfaces. The rear surface includes instructions for telephone dialing. A scratch-off label strip has been adhered to the rear surface. The scratch-off label strip has opposing sides, one side having a self-adhesive positioned thereon that removably adheres to scratch-off label onto the planar card member. The other side has a PIN code field containing a printed PIN (personal identification number) thereon. A control code field is positioned adjacent the PIN code field and has a control code printed thereon. A scratch-off layer covers only the PIN code field to obscure from viewing the PIN and leaving unobscured the control code field.

In still another aspect of the present invention, a method of applying a PIN (personal identification number) and control code onto a debit card comprises the step of supplying a batch of planar and rigid card carriers, each containing at least one rectangular configured, planar card member that is wallet sized and has front and rear surfaces, while drawing in succession a single card carrier at a time in vertical orientation from the batch into a belt delivery system. The card carrier is rotated 90° to lay the card carrier flat, and while the card carrier is flat, the card carrier is fed into a labeling station. At the labeling station, the scratch-off label strip is adhered onto the rear surface of the planar card member that is part of the card carrier. The scratch-off label strip has opposing sides and one side has a self-adhesive positioned thereon that removably adheres the scratch-off label onto the planar card member during labeling. The other side has a PIN code field containing a printed PIN (personal identification number) thereon. A control code field is positioned adjacent the PIN code field and has a control code printed thereon. A scratch-off layer covers only the PIN code field to obscure from viewing the PIN code, while leaving exposed the control code field.

BRIEF DESCRIPTION OF THE DRAWINGS

Other objects, features and advantages of the present invention will become apparent from the detailed description of the invention which follows, when considered in light of the accompanying drawings in which:

FIG. 8 is a schematic, side elevation view of the labeler used for applying the scratch-off label to an article.

FIG. 9 is a perspective view of a tray sorter showing a plurality of article bins and feed belt assemblies.

FIG. 11A shows the rear side of a planar card carrier member having a phone card secured by perforations.

FIG. 12 is an overall perspective view of a system similar to the card processing system shown in FIG. 1, except a tabbing operation is illustrated, where articles such as envelopes are fed vertically (standing up), laid down, and then oriented vertically for sorting.

DETAILED DESCRIPTION OF THE PREFERRED EMBODIMENTS

The present invention is advantageous because it allows the controlled feeding of an article, such as a phone card or credit card, or mail products of different thickness, from a stack held in a feeder bin, and into a singulated stream without bunching. The present invention is also advantageous because it provides for the application of a scratch-off label onto an article, such as on a telephone card or other debit or credit card article, in an efficient manner without requiring ink printing of any control codes or PIN's onto the card. The present invention is also advantageous because the cards or other mail articles can be fed vertically (standing up), laid flat for further processing, such as for tabbing, labeling or other applications, and then oriented vertically for sorting.

Figure 1:
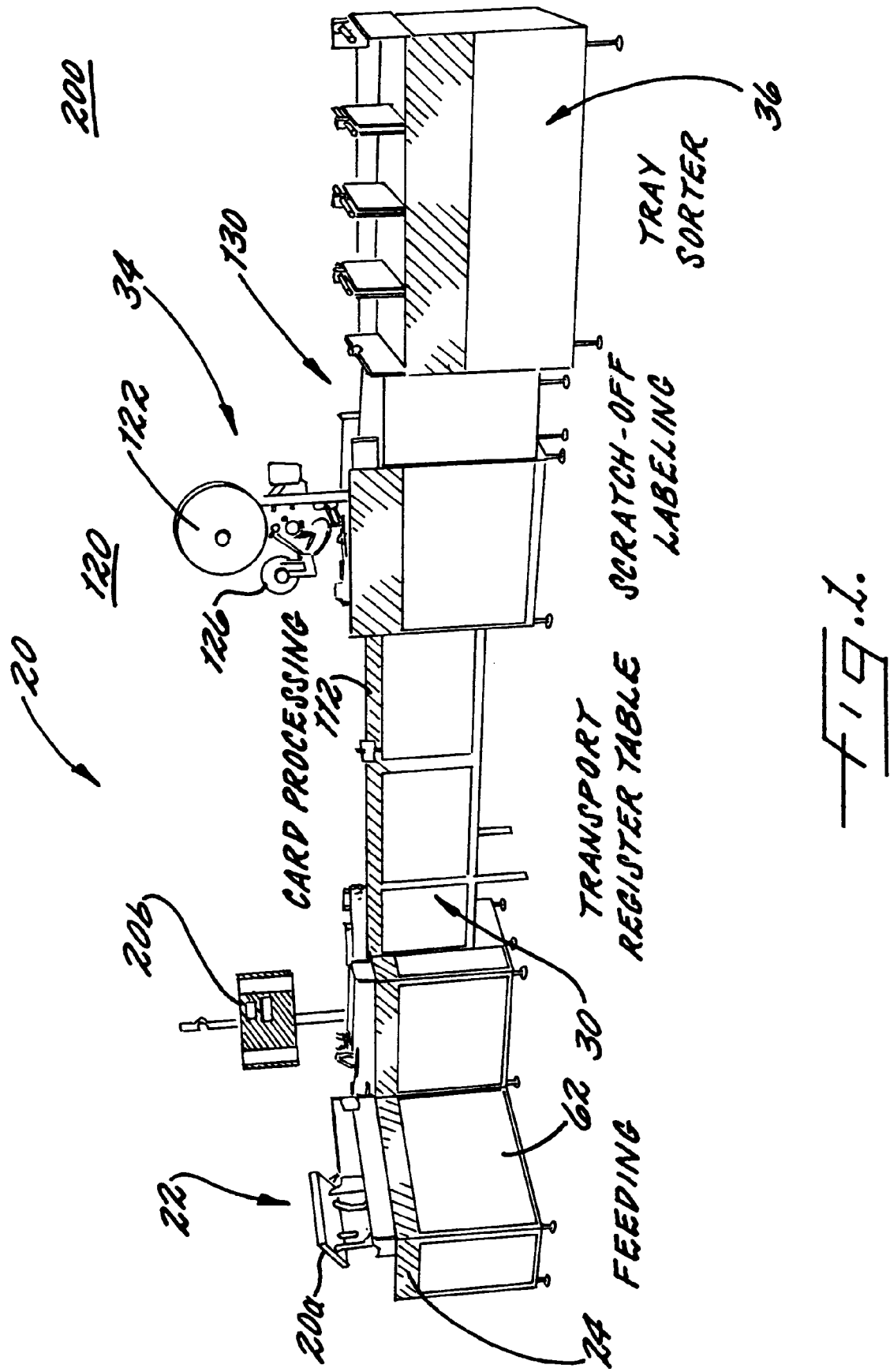
FIG. 1 is an overall perspective view of an automated card processing system of the present invention showing an article feeder, a transport register table, a scratch-off labeling station, and a tray sorter.
Figure 2:
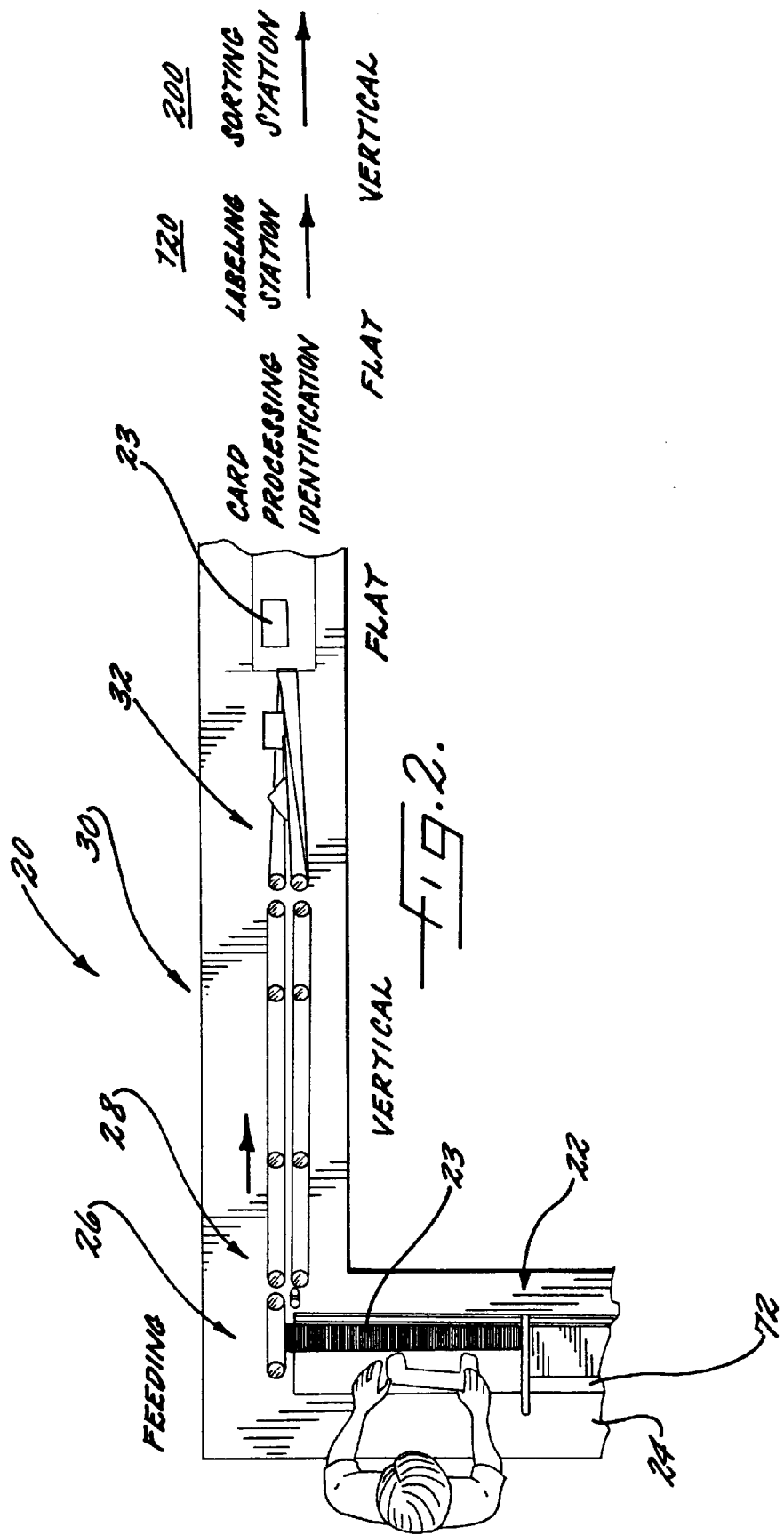
FIG. 2 is a fragmentary plan view of the automated card processing system showing the feeder, transport register table, the general location of labeling and sorting stations, and the locations where a debit card or other article is oriented vertical (standing up), flat and then vertical during processing.

FIG. 1 shows an overall perspective view of an automated card processing system 20 as used with the present invention, having controller 20a for controlling the article feed and controller 20b for controlling subsequent processing. FIG. 2 illustrates a fragmentary plan view of the system 20 with an article feeder 22 storing a large plurality of cards, such as wallet sized debit cards, which are illustrated as phone cards 23, stacked in a feeder bin 24.

FIG. 11A shows that a phone card can be contained within a card carrier member, illustrated at 23a. The actual phone card can be perforated and separated from the card carrier member. For example, in the initial processing of a rigid and planar hard plastic material that would form the card carrier member, the actual phone card can be outlined by perforations. Later, the card carrier member can be processed to place information on the area within the perforations that form the phone card. A plurality of card carrier members can then be stacked within the article feeder and feeder bin 24, and processed in a manner as will be described below. Although the description will apply to wallet sized phone cards, it should be understood that the card carrier member as shown in FIG. 11A can also be processed, and may be a preferred manner for processing. Thus, many different types of card carrier members having different dimensions, widths and heights can be processed.

It is possible to have a card carrier member that includes one or more phone cards that could also later be stamped out instead of broken by perforations. Also, the card carrier member could be printed with a designation, such as the card origin, i.e., "ABC Store", to indicate the source of a phone card. The card carrier members can be displayed at a point-of-purchase display such as hanging the card carrier member via the open slot 23b onto a post of a point-of-purchase display within a store. The card carrier member can then be fed in a vertical orientation followed by turning into the flat or laid-down configuration for processing, such as labeling, and then turned and stood back up in a vertical, standing-up orientation for sorting, as will be explained below.

The cards are then fed against a stripper belt mechanism 26 and discharged one at a time in a vertical, i.e., standing up orientation, in what is termed as a singulated manner via a feed discharge belt assembly 28 processing area, which includes a transport register table 30, which could include an associated air transport table.

As shown in FIG. 2, the article is laid flat by a twisted belt feed section 32, which orients the card 90° to lay the card flat. With the phone card 23 of the present invention, the phone card can be processed and identified, as well as encoded in some instances. The card or card carrier member 23a can advance while laying flat onto an air transport table having an associated scratch-off labeler 34 that applies a scratch-off label 27 onto the phone card. The phone card moves into a tray sorter 36, as shown in FIG. 9, which includes a plurality of article bins 212 where the cards or other articles are stacked, as will be explained below.

Figure 10:
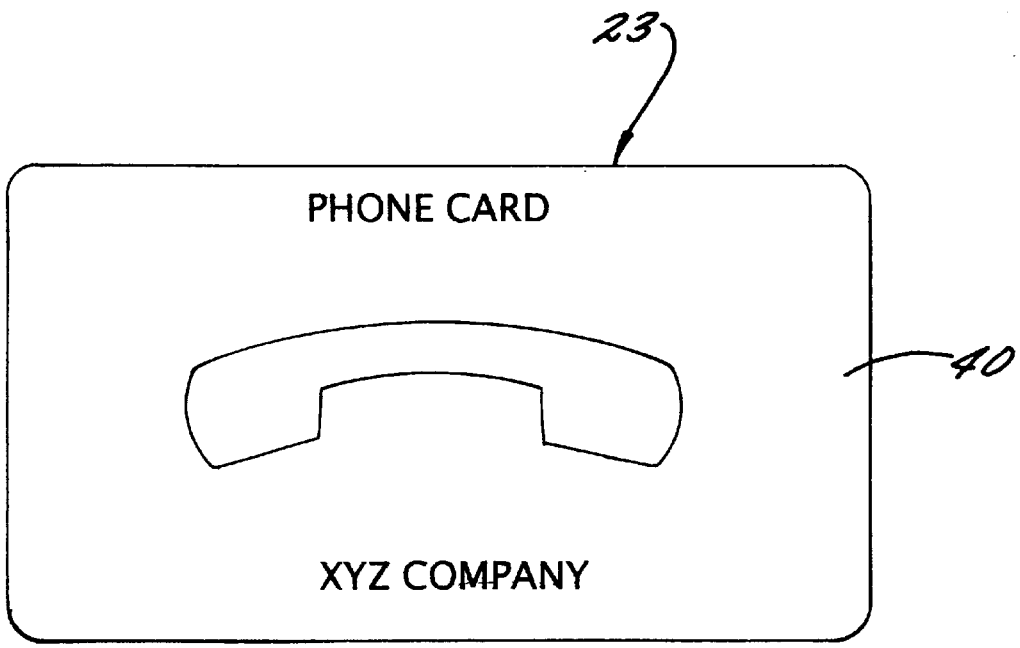
FIGS. 10 and 11 show the front and rear (reverse) sides of a phone card of the present invention having the scratch-off label applied on the rear face.
Figure 11:
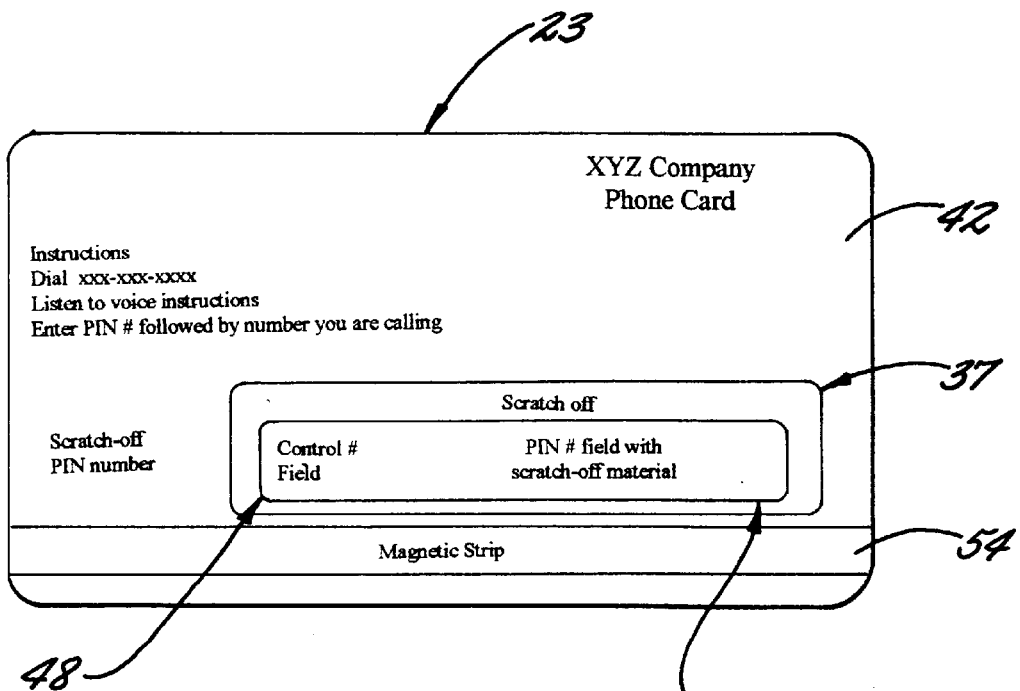

FIGS. 10 and 11 show an example of the phone card 23 of the present invention having a scratch-off label 37 of the present invention applied onto the rear face. The phone card is of a type such as issued by various telephone and other companies. The phone card is wallet sized and formed of a rigid plastic material. Although the card is illustrated as a phone card, it could be a credit card, phone card or other similar type of debit card.

The phone cards are common in the United States and in many Latin American countries, where the phone cards can be used without having to establish accounts or billing connections with a telephone company. The card 23 includes on its front face 40 (FIG. 10) the identification of the phone card company, such as XYZ Company. The rear or back face 42 includes instructions for using the phone card, such as "Dial XXX XXX XXXX," corresponding to the number of the respective card issuer. An instruction to listen to any voice instructions on the phone is printed below the dialing instruction. Naturally, the voice instructions tell a user how to use the phone card. Such instructions could include also written instructions, such as instructions of how to enter the PIN number followed by the number the user is calling. Also, because a PIN number is secret, the instructions can include the directions for scratching off the covering contained over the PIN number.

Figure 8A:
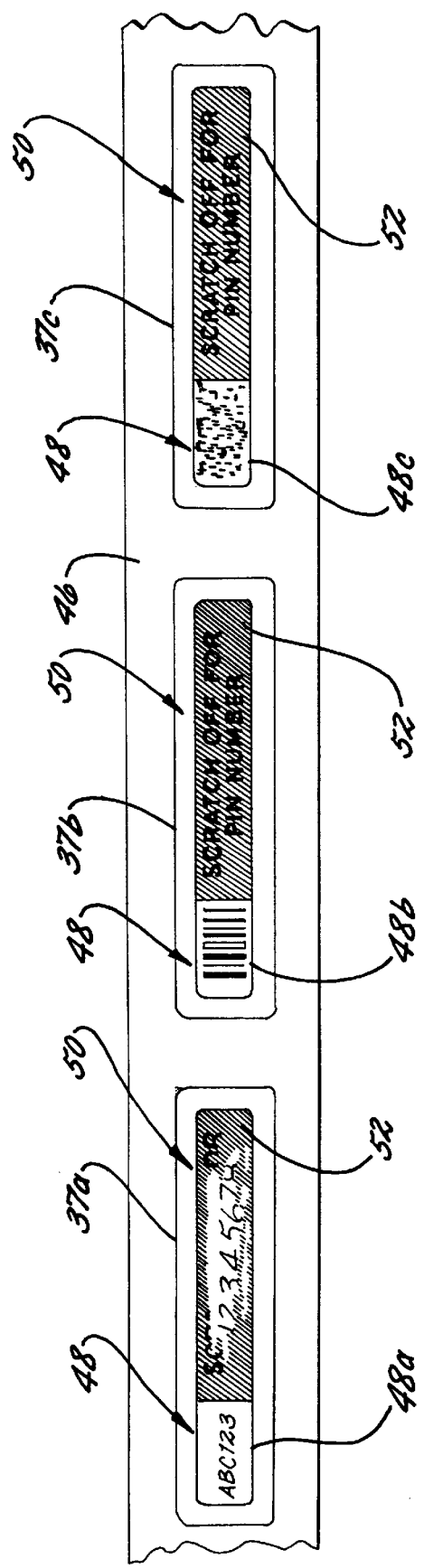
FIG. 8A is an example of a carrier web showing scratch-off labels applied in spaced orientation.

FIG. 11 also illustrates the scratch-off label 37 of the present invention that has been applied to the phone card. The label 37 typically is formed from a lower label film, i.e., base label layer 44, such as formed from polyester or some other thin film material. This lower label film 44 forms the base part of the scratch-off label 37 and a plurality of these lower label films 44 forming the labels 37 are positioned on a carrier web 46 (FIG. 8A) as known to those skilled in the art. The carrier web 46 having the applied labels is typically wound on a supply roll as known to those skilled in the art. The lower side of the lower label film 44 engaging the carrier web includes a self-adhesive that adheres the label 37 to the carrier web. A control code field 48 is positioned on one side of the lower label film 44, together with an associated PIN code field 50. The PIN code field 50 has a PIN printed thereon and is covered with a scratch-off paint or other coating 62 that can be scratched-off by the purchaser of the phone card. The PIN typically is four to eight digits or could include an alphanumeric code. FIG. 8A illustrates three scratch-off labels carried on a web. The first label 37a has a portion of the coating 52 scratched off to display a numeric PIN code.

The control code field 48 is not coated and is left exposed on the label. This field 48 could include an alphanumeric code 48a, a bar code 48b or a two-dimensional bar code 48c, as illustrated in FIG. 8A. It is also possible to use a series of snow flakes or dots formed as a grid or matrix that can be decoded in bit form. The bar code can be a two-dimensional bar code with a dot matrix configuration. As is known, the control code could be scanned optically by other means to allow encoding via a data encoded strip, such as a magnetic strip 54, of dollar amounts. Other information could be contained on the magnetic strip as is well known to those skilled in the art. It is also possible to apply the data encoded strip as a label stripe during processing before, simultaneously or after the application of the scratch-off label 37.

The article feeder 22 of the present invention can be used not only for feeding thick and rigid articles, such as credit cards and phone cards, but can also be used for feeding many different types of mail, including small envelopes to large envelopes of varying thickness and intermixed mail that is tabbed. The article feeder 22 can feed up to 50,000 pieces per hour and has a unique feed system, e.g., singulator, to allow most inter-mixed mail to feed without adjustments from a large stack, such as shown in FIG. 2, where exemplary phone cards are stacked in a stand-up, i.e., vertical configuration. Although FIG. 2 shows a large plurality of about three feet of phone cards stacked in the feeder bin 24, any type of mail can be intermixed and then fed single into the feed discharge belt assembly 28.

Figure 3:
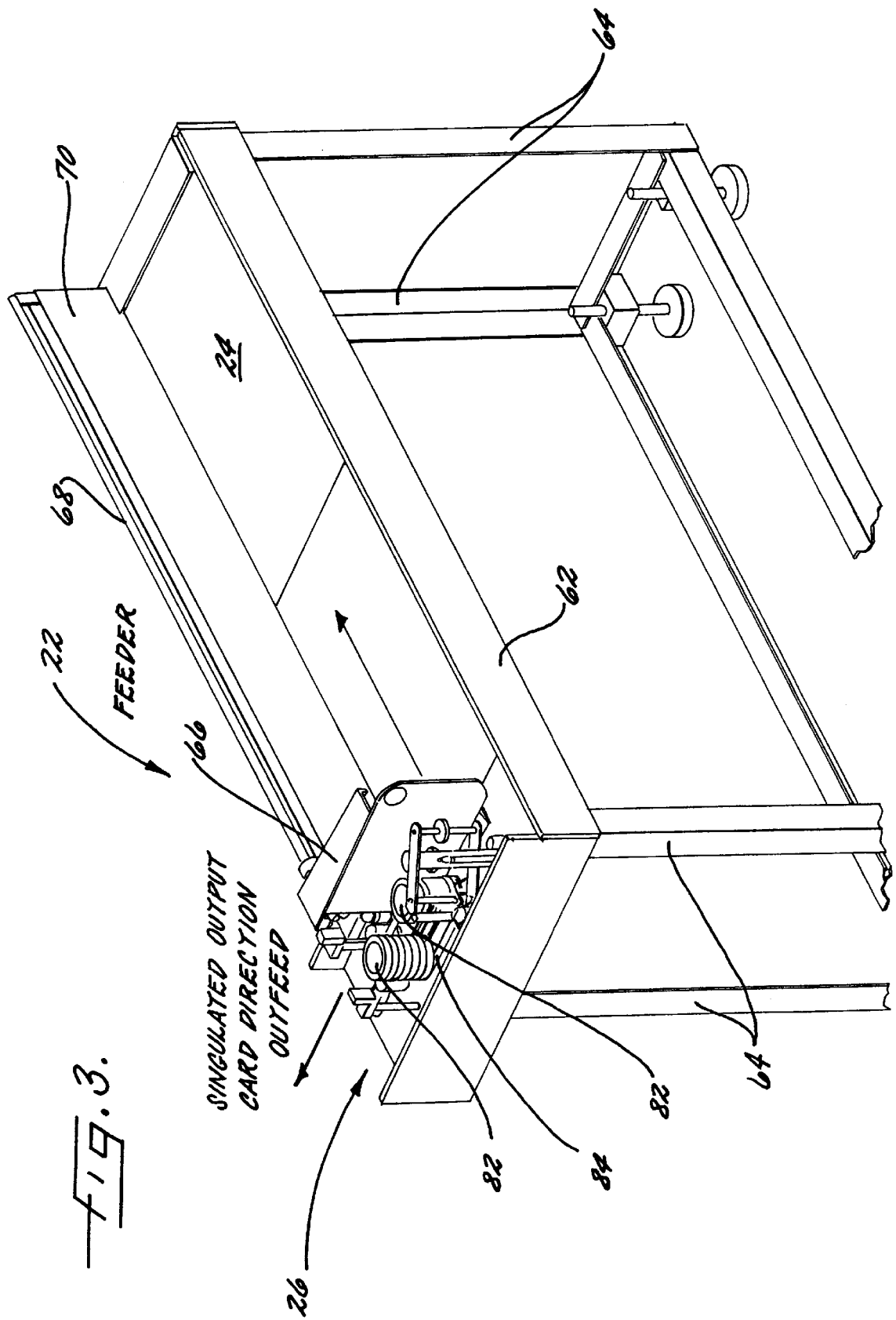
FIG. 3 is a schematic, isometric view of the article feeder and showing details of the article stripper mechanism.
Figure 4:
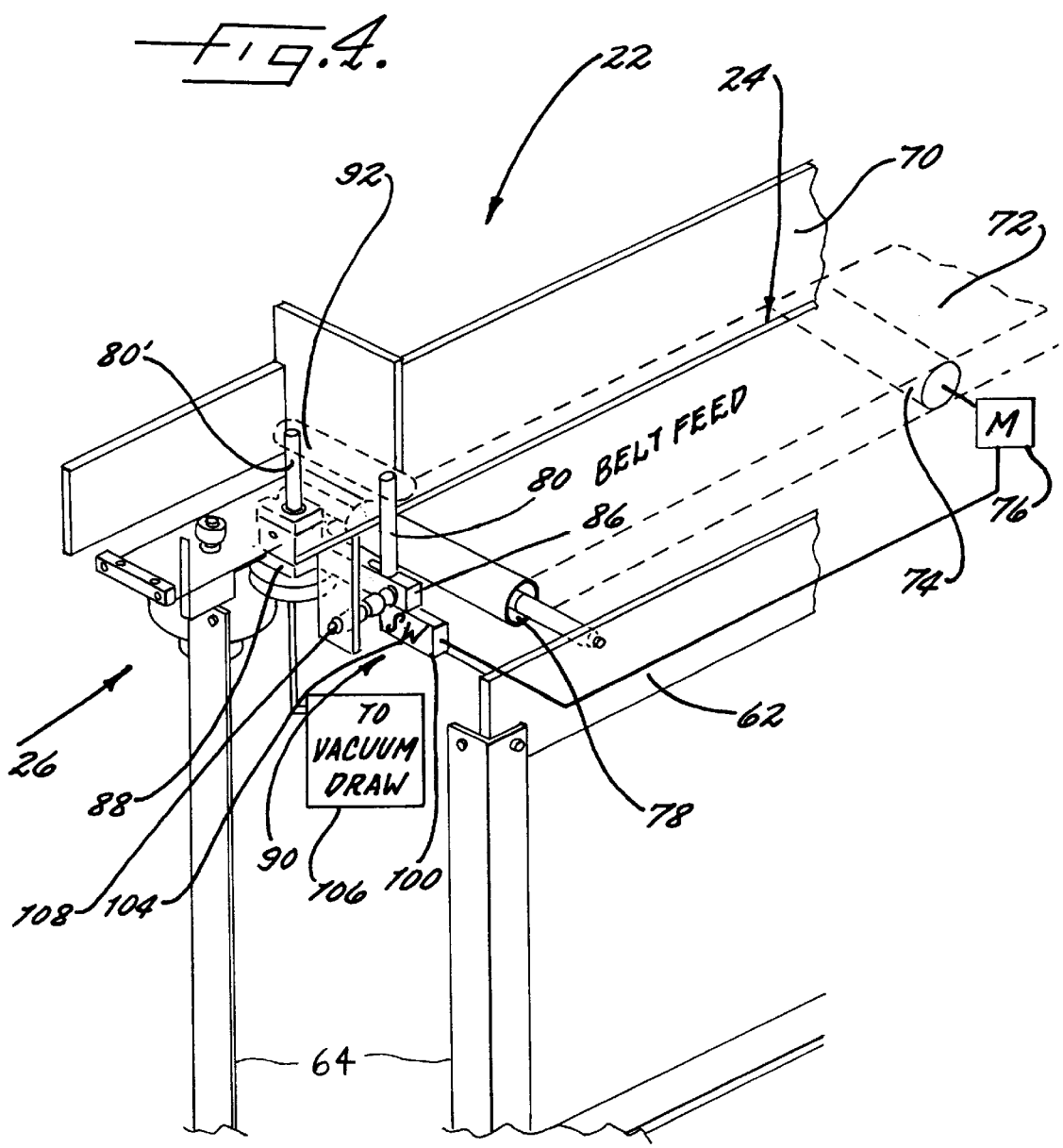
FIG. 4 is a partial isometric view of the article feeder of FIG. 3, showing greater details of the stripper mechanism, including the belt feed, vacuum draw and microswitch for controlling the belt feed motor.

As shown in greater detail in FIGS. 3 and 4, the feeder bin 24 is positioned on a support table 62 having support legs 64, which give a feed height that is the same as the other components and tables of the automated card processing system, as shown in FIG. 1. An article retaining plate 66 is slidably moveable on a guide rod 68 and positioned adjacent a side support 70. Cards, such as the illustrated phone card, or other articles, such as pieces of mail and envelopes, are stacked against the side support 70. The retaining plate 66 is moved forward with spring biasing against the articles as shown in FIG. 2. As better shown in FIG. 4, the stack of articles positioned in the feeder bin 24 rest on a conveyor belt 72 that is positioned over a first belt pulley 74, which is driven by a motor 76 that actuates and drives a second belt pulley 78.

Figure 5:
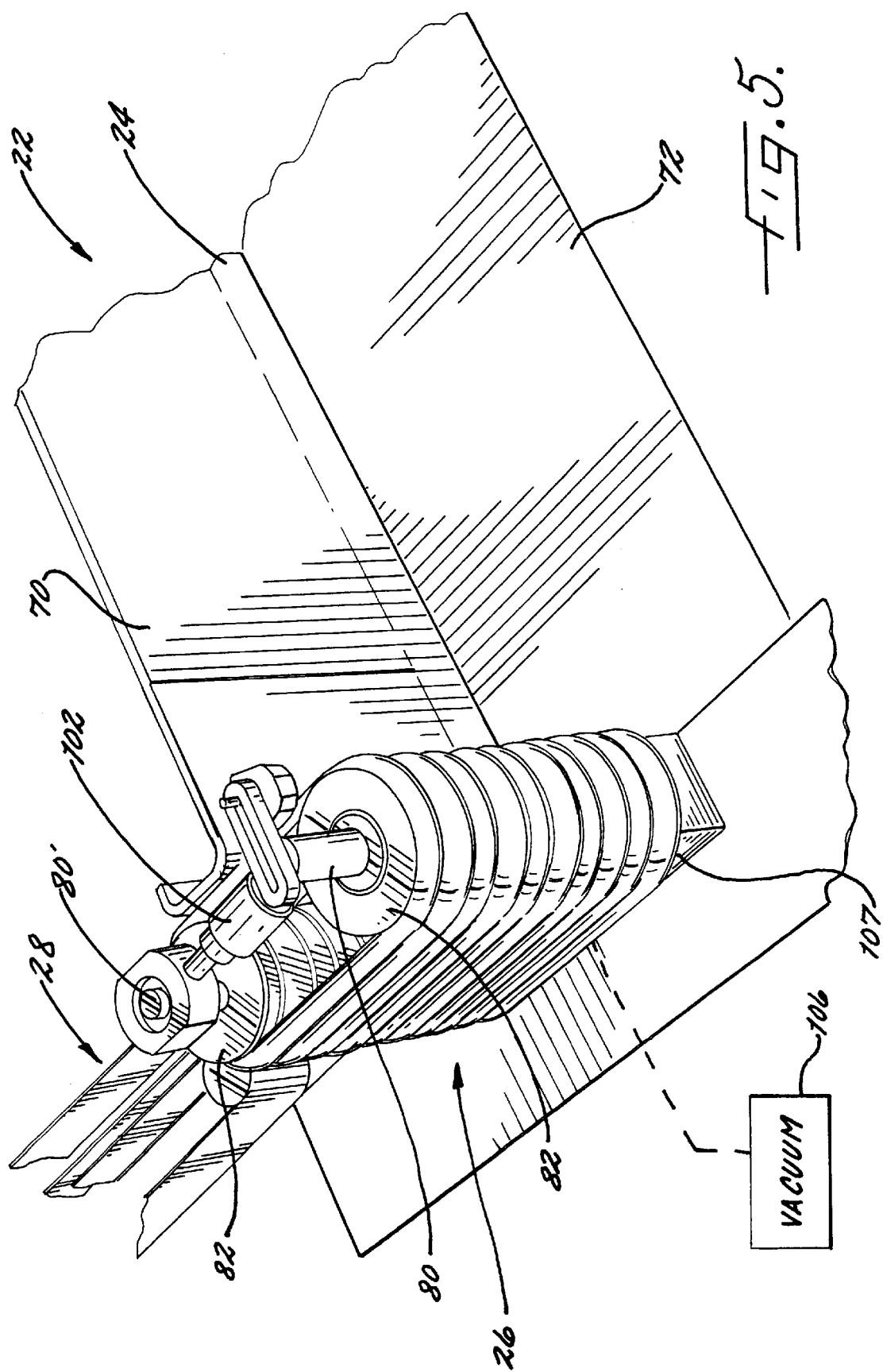
FIG. 5 is an enlarged isometric view of the stripper belts shown in FIG. 3.

FIG. 5 is an enlarged isometric view of the stripper belt mechanism 26 for the article feeder 22. The stripper belt mechanism 26 includes two stripper support shafts 80 (FIGS. 3 and 4) that support stripper rolls 82 having a plurality of stripper belts 84 positioned on the stripper rolls 82. As shown in FIG. 4, the first and second stripper support shafts 80 are positioned such that the stripper rolls 82 and associated stripper belts 84 provide a flat surface against which the cards or other articles engage the belts as shown in FIG. 2.

The stripper support shafts 80 are supported on a horizontally moveable shaft support member 86 that is moveable in a direction to and from the article conveyor belt 72. A drive motor 88 engages one of the stripper support shafts, i.e., the first shaft, to rotate the associated stripper rolls and stripper belts. In FIG. 4, the first stripper support shaft 80' is powered for rotation. An adjustable biasing member 90 is engaged against the shaft support member 86 and applies a biasing force against the shaft support member 86 to allow a back pressure to be exerted against articles stacked in the feeder bin 24.

Figure 6:
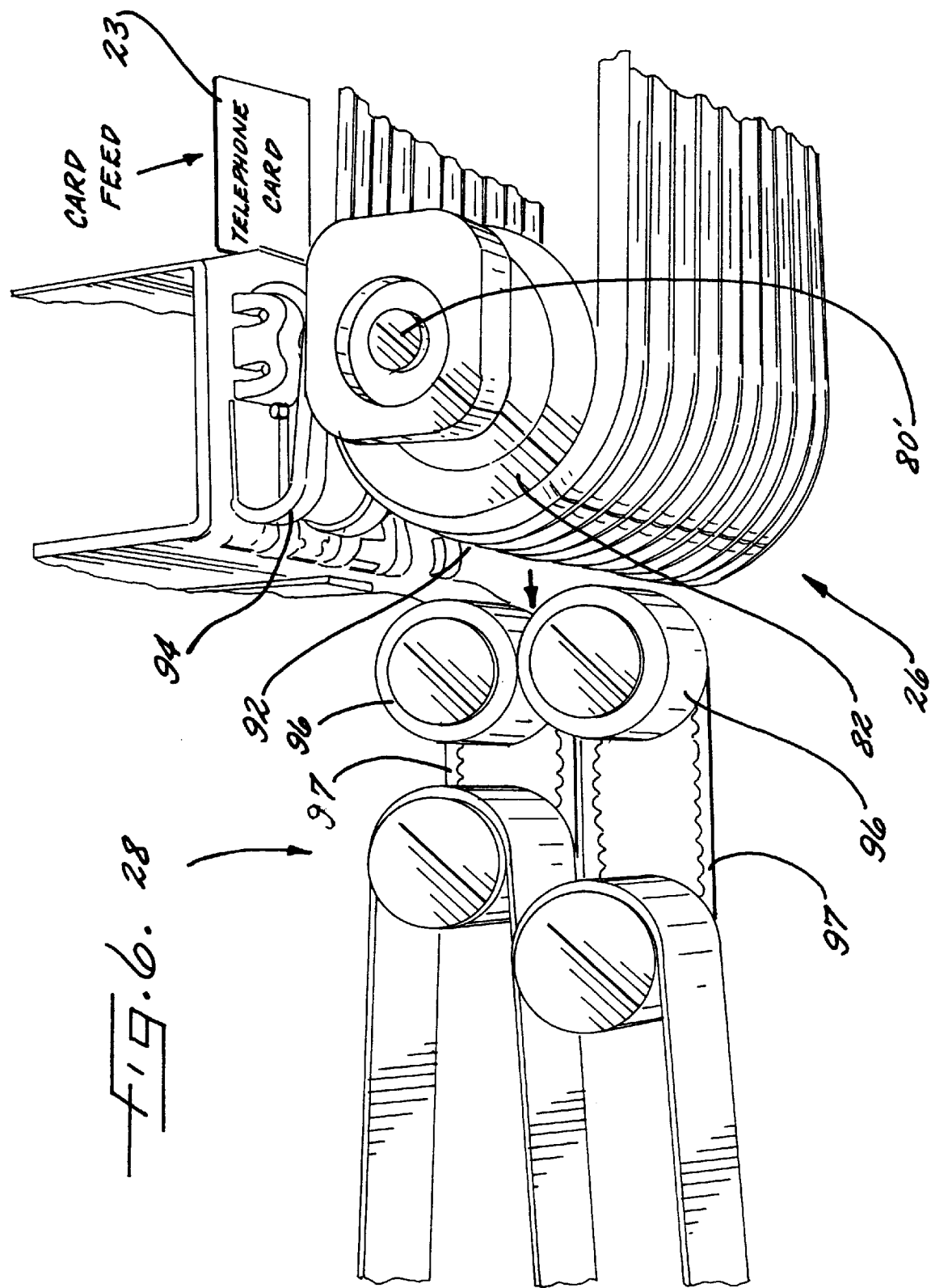
FIG. 6 is another isometric view of the stripper belts and showing the stripper fingers and feed discharge belt assembly.

Friction between the article, such as the illustrated phone card, and the stripper belts 84, allows an article to be "stripped" or drawn away from the stack in singulated fashion, one-by-one, into the feed discharge belt assembly 28. As shown in FIG. 6, each article is pulled away from the article stack through a pre-shingler 92, such as formed from Teflon, and through a series of stripper fingers 94, which guide the article through two discharge pinch rolls 96, which then feed the article into the discharge belts of the feed discharge belt assembly 28. The feed discharge belt assembly 28 and pinch rolls 96 can be driven from common belt transmission 97. At the same time, the stack of articles is pushed by the conveyor belt 72 and retaining plate 66 against the stripper belts 84 to create friction. The conveyor belt movement is controlled in off/on fashion by a microswitch 100, as shown in FIG. 4 as a schematic, rectangular block. A pressure coupling mechanism 102 is mounted on top of the support shafts and the microswitch 100 could be operative with the coupling mechanism (FIG. 5). Different types of microswitches can be used as known to those skilled in the art.

In one aspect of the present invention, the biasing member 90 is formed as spring 104, and biases the shaft support member 86 forward, which in turn, biases the stripper belts 84 against the stack of articles. As the spring biases the shaft support member 86 forward, it actuates the microswitch 100, which turns the conveyor belt motor 76 on and advances the conveyor forward to force cards or articles against the stripper belts. This action forces the stripper belts and shaft support member 86 back, actuating the microswitch to turn the motor off. This releases the back pressure against the article. However, as noted before, with this system only, thinner articles, such as very thin envelopes, sometimes have excessive pressure exerted against them, and as a result, "bunches" of envelopes or other thin articles could be grabbed under friction and forced through the discharge area.

In accordance with the present invention, vacuum is applied from a vacuum source 106 onto the area associated with the front part of the stripper belts, such as through a vacuum plate 107, having vacuum orifices contained in the plate, or through orifices in the shafts or other means, to draw the first article in the stack against the stripper belts 84 (FIG. 5). Also in accordance with the present invention, the spring 104 is adjustable, such as by an adjustable screw 108, as illustrated, to increase or decrease the amount of tension, and thus, the exerted back pressure. Thus, it is possible to decrease the amount of tension (back pressure) that could be applied by the stripper belts onto the article stack such that primarily the vacuum provided by the vacuum source 106 would retain an article, such as a thin envelope, against the stripper belts. With this low pressure used for retaining an article, such as when thin articles are fed, only one thin article would be fed or "stripped" into the feed discharge belt assembly 28.

The smaller biasing force of the retaining plate 66 can also be used to push the articles with sufficient pressure against the belts, which together with the vacuum draw of the article, allows article feeding in a singulated fashion even when thin articles and envelopes are used or other articles of mail. If thicker articles, such as a phone card or credit card, are stacked in the feeder bin, then greater back pressure can be exerted by adjusting the spring pressure to allow greater back pressure and allow "stripping" of the cards from the stack.

The article passes into the feed discharge belt assembly 28 and into a transport register table 30. Up to this point in time, the articles have been processed in vertical orientation, i.e., "standing up." At this time, the article is laid flat by the twisted belt feed section 32, which rotates the article 90° to lay the article flat for further processing, such as tabbing, or as in the present description, to allow card processing identification, such as encoding, and labeling, where the scratch-off label 37 is applied. An example of a type of twisted belt feed section that could be used is disclosed in U.S. Pat. No. 5,393,366 and assigned to the present assignee of the present invention, Profold, Inc., the disclosure which is hereby incorporated by reference in its entirety.

The card is transported along the transport register table, which also could include an associated or separate air transport table 112, which is designed for high-speed, i.e., 50,000 pieces per hour. Air suction is low vacuum and has high air volume for strong article adherence to the belt surface, such as 700 cubic feet of air suction per minute. The air transport could be formed with two belts for more controlled applications of larger articles besides cards, such as envelopes, and also provide control over other processes, such as with ink jet printing. A solid strip can separate the two parallel belts. The air transport table can be adjusted in height and has a modular design to be used in line with feeders, tabbers, labelers, affixers, and other equipment.

Figure 7:
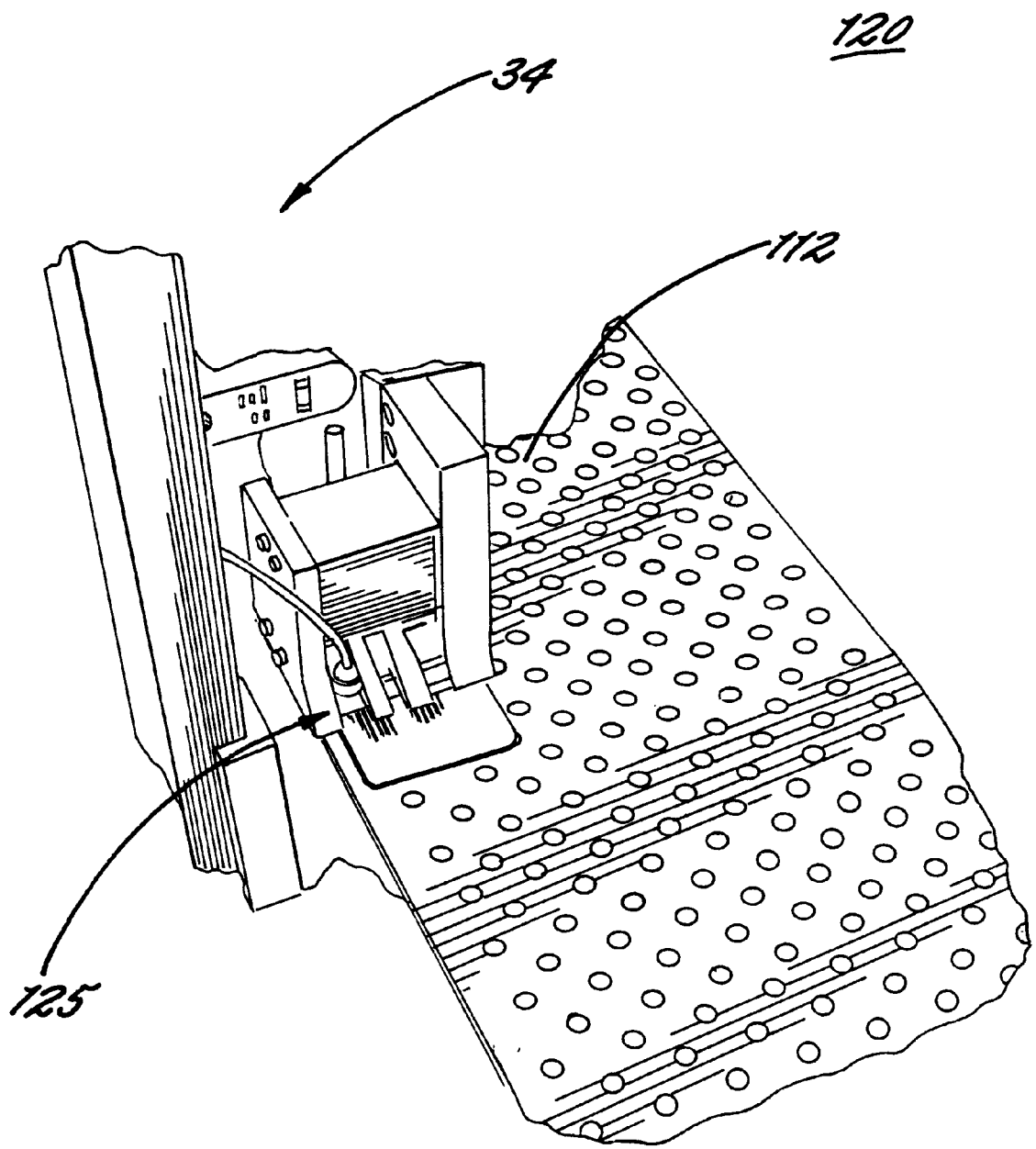
FIG. 7 is a partial isometric view of a labeler used for applying the scratch-off label of the present invention.

FIGS. 7 and 8 show a labeling station 120 where a scratch-off labeler 34 has a supply reel 122, having a roll formed of carrier web of labels in which a series of idler and drive rolls 124 form a serpentine, controlled delivery path for the carrier web where the label is stripped by a label stripping mechanism 125 from the carrier web, in timed unison, with the phone card as the phone card advances into the label applying station 120. The label 37 adheres to the phone card. The carrier web is taken up in a take-up reel 126.

One of the benefits of the label 37 of the present invention over prior art phone cards using a printed PIN and control code is the accuracy required when any scratch-off paint or other coating was applied. The application of any coating had to be accurately aligned with the printed PIN number while leaving unexposed the control code. It also could not interfere with the control code field. With the present invention, on the other hand, the label having the preprinted control code field and PIN in the PIN code field can be applied onto the phone card at very high speeds, up to 50,000 pieces an hour, with some inaccuracy as long as the label does not cover the magnetic strip. The phone card would be operable.

Once the cards have been labeled, they are then transported into an article stand-up feed section 130, where a 90° feed belt section turns the cards in vertical, i.e., "standing up", orientation. The cards are then fed into a sorting station 200, such as that shown in FIG. 9, where a plurality of article bins receive articles from respective feed belt assemblies as explained below.

Referring now to FIG. 9, there is illustrated the sorting station 200, which includes a tray sorter 36 that sorts articles, such as the illustrated phone card or other articles and mail pieces, by feeding individual articles in vertical orientation along a predetermined path of travel into a respective article bin 212. The articles could include mixed pieces that have different sizes, including different lengths and widths of mail and different thicknesses. However, in the illustrated example, the articles are the same-size phone cards 27. An example of an article bin is disclosed in commonly assigned U.S. patent application Ser. No. 09/315,693, filed May 20, 1999, entitled APPARATUS AND METHOD FOR SORTING MAIL, the disclosure which is hereby incorporated by reference in its entirety.

As evident, the sorting station 200 has four article bins 212 that receive articles from four respective feed belt assemblies 214. Although four article bins 212 and four feed belt assemblies 214 are illustrated, naturally, the sorting station 200 can include one, two or any number of different article bins having respective feed belt assemblies as necessary for the processing of articles.

Each article bin 212 includes two parallel side walls 212a and a biased end wall 212b, forming a rectangular configuration. The end wall 212b is slidable on a support rod 212c via a support flange 212d that extends across the top portion of the end wall 12b. A bottom surface 212e holds the article. Sheet steel, plastic or other materials known to those skilled in the art can be used to construct the article bin.

The articles are fed by the feed belt assembly 214 in a vertical orientation, and not horizontal. The articles enter the feed belt assembly 214 having at least one large longitudinally extending feed belt 218 that is driven by a drive roller 220 connected to a drive motor (not shown) at the belt end defined by the endless loop. The belt 218 engages stationary tension rolls 222 that maintain pressure on the feed belt 218. The feed belt 218 is a flat belt. Positioned adjacent the feed belt is another flat drive belt 224. The article is passed between the endless loop feed belt 218 and the endless loop flat drive belt 224.

As illustrated, in accordance with the present invention, the feed belt assembly 214 includes a discharge end positioned adjacent the article bin 212, for discharging articles into the bin 212. The feed belt assembly 214 at its discharge end 226 can include first and second brush rolls 230,232 positioned at the discharge end of the feed belt assembly. When articles are thin mail pieces, the brush rolls can be used to impart a concave profile to the mail piece to aid in reducing any damage to a side edge of each individual mail piece. When the articles are smaller dimensioned phone cards, the brush rollers do not have to be used.

FIG. 12 shows another article handling system, indicated at 320, such as for mail pieces 323. Similar components as in the previous system described with reference to FIG. 1 are set forth in the 300 series of reference numerals, and 400 for the sorter and stand-up section 530. A tabber 500 is illustrated in-line with the twisted belt feed assembly. FIG. 10 illustrates the tabber 500, such as the type sold by Profold, Inc. of Sebastian, Fla., under the trade designation Linx and Linx DX. The tabber 500 includes supply reel 502, take-up reel 504 and guide rolls 506. A further processing could include ink jet transport station 520 for ink jetting mail, as known to those skilled in the art.

Pressure sensitive stamps could be placed on articles. The ink jet base could use a cost effective trident head that can operate at speeds to 22,000 pieces per hour, and a roll-up system that hangs over the transport so it can be moved out of the way. A Sciter or Video Jet could also be used. FIGS. 1 and 12 both illustrate that articles can be fed in a vertical orientation and then laid flat for processing, such as the tabbing of FIG. 12, or the labeling as described with reference to FIGS. 7 and 8. The articles are then oriented vertically, "stood up", for sorting within a sorting station, such as with bins. This type of processing is a more efficient system than known prior art systems that print or process standing up in vertical orientation.

An example of the tabber and a processing line that can be used for feeding vertically and then laid down for processing, such as tabbing, and then feeding into an article bin is disclosed in U.S. patent application Ser. No. 08/997,565 filed Dec. 23, 1997, by the assignee of the present invention, the disclosure which is hereby incorporated by reference in its entirety. This tabber is advantageous, and as illustrated in FIG. 12, and allows feeding of intermixed pieces of mail to the tabber. The mail can have a plurality of different widths, lengths and thicknesses so that each of the plurality of intermixed pieces of mail would have a commonly oriented edge or side to be tabbed. For example a thickness can range from 0.007 to about 0.25 inches and the physical size of width and length dimensions can vary from 3.5 inches by 5.0 inches to about 8.5 inches by about 11.5 inches.

A commonly oriented edge to be tabbed is preferably defined as the edge or side of an article, or piece of mail being generally perpendicular to the orientation of the address and reading the address of the piece of mail. When the piece of mail or the address label thereof is properly oriented for displaying or reading the characters in a name and address sequence, the commonly oriented edge to be tabbed is generally perpendicular to this character or address sequence. The leading edge can preferably be the right-hand side when reading an address. This right-hand side or front edge preferably is commonly oriented and fed first as the leading edge downstream in the apparatus. It can also be recognized by those skilled in the art that the addressed side of a piece of mail can be fed or positioned face down instead of face up.

The tabber is positioned downstream from the article feeder and the direction aligned with an adjacent, commonly oriented edge to be tabbed for positioning at least one tab on each of the plurality of intermixed pieces of mail or articles. This tabber advantageously can eject or place more than one tab onto a piece of mail. A sensor, such as a photo cell or photo diode array, preferably senses the length of the edge to be tabbed of each of the pieces of mail, especially relevant if they are intermixed, and converts the sensed length to encoder counts. These encoder counts are then used to determine the position of the tab. For example, if the side or edge E to be tabbed is less than a predetermined length, e.g., four inches, then only one tab will be placed on the piece of mail in the center of the piece. On the other hand, if the side or edge to be tabbed or greater than or equal to a predetermined length, e.g., four inches, then a pair of tabs can be placed on the piece of mail with each tab respectively positioned about one inch from the two corners or ends along the side or edge of the piece of mail.

The tabber can also include a dispensing mechanism, e.g., a tab dispenser, for dispensing at least one tab onto each of the plurality of intermixed pieces of mail so that the dispensed tab extends about half off in the outer surface of the piece of mail at the commonly oriented edge to be tabbed. A tab wrapper can be positioned downstream from the tab dispenser for wrapping or folding the tab around the commonly oriented edge to be tabbed as each of the plurality of intermixed pieces of mail travels downstream along the predetermined path of travel. If the edge is unsealed or open, then the wrapping or folding preferably closes or seals the unsealed or open edge.

An example of the orienter for turning mail about 90° and can be used with the present invention is seen in U.S. Pat. No. 5,393,366 having the common assignee as the present application and which is incorporated herein by reference in its entirety.

The orienter or rotator that orients the plurality of pieces of mail and articles about a predetermined angle, e.g., preferably 90°, of orientation prior to position at least one tab thereon is in effect a "bump turn" or pivot point into which a piece of mail abuttingly contacts or bumps into, the contacting edge stopped, and mail piece returned or rotated about the pivot point.

This application is related to copending patent applications entitled, "ARTICLE FEEDER AND METHOD OF FEEDING, Ser. No. 09/496,110, filed Feb. 1, 2000" and "APPARATUS AND METHOD OF FEEDING AND PROCESSING ARTICLES AND PIECES OF MAIL, Ser. No. 09/496,028, filed Feb. 1, 2000" which are filed on the same date and by the same assignee, the disclosures which are hereby incorporated by reference.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that the modifications and embodiments are intended to be included within the scope of the dependent claims.

That which is claimed is:

1. A telephone calling card comprising:
   a rectangular configured, planar card member that is wallet sized and has front and rear surfaces, said rear surface including instructions for telephone dialing;
   a scratch-off label strip that has been adhered to the rear surface, said scratch-off label strip having opposing sides, one side having a self-adhesive positioned thereon that removably adheres the scratch-off label onto the planar card member, the other side having a PIN code field containing a printed PIN (personal identification number) thereon, and a control code field positioned adjacent the PIN code field and having a control code printed thereon, and a scratch-off layer that covers only the PIN code field to obscure from viewing the PIN code while leaving unobscured the control code field.

2. A telephone calling card according to claim 1, wherein said scratch-off label strip includes a base label layer that had been removed from a carrier web during an automated labeling process.

3. A telephone calling card according to claim 1, wherein said control code comprises a two-dimensional bar code.

4. A telephone calling card according to claim 1, wherein said control code comprises a bar code.

5. A telephone calling card according to claim 1, wherein said control code comprises an array of dots.

6. A telephone calling card comprising:
   a rectangular configured, planar card member that is wallet sized and has front and rear surfaces, said rear surface including instructions for telephone dialing;
   a data encoded strip positioned on the rear surface of the card;
   a scratch-off label strip that has been adhered to the rear surface, said scratch-off label strip having opposing sides, one side having a self-adhesive positioned thereon that removably adheres the scratch-off label onto the planar card member, the other side having a PIN code field containing a printed PIN (personal identification number) thereon, and a control code field positioned adjacent the PIN code field and having a control code printed thereon, and a scratch-off layer that covers only the PIN code field to obscure from viewing the PIN code while leaving unobscured the control code field.

7. A telephone calling card according to claim 6, wherein said data encoded strip is formed as a magnetic strip.

8. A telephone calling card according to claim 6, wherein said data encoded strip is formed as a label stipe that has been applied in an automated labeling process.

9. A telephone calling card according to claim 6, wherein said scratch-off label strip includes a base label layer that had been removed from a carrier web during an automated labeling process.

10. A telephone calling card according to claim 6, wherein said control code comprises a two-dimensional bar code.

11. A telephone calling card according to claim 6, wherein said control code comprises a bar code.

12. A telephone calling card according to claim 6, wherein said control code comprises an array of dots.

13. A debit card comprising:
a rectangular configured, planar card member that is wallet sized and has front and rear surfaces;
a data encoded strip positioned on the rear surface of the card;
a scratch-off label strip that has been adhered to the rear surface, said scratch-off label strip having opposing sides, one side having a self-adhesive positioned thereon that removably adheres the scratch-off label onto the planar card member, the other side having a PIN code field containing a printed PIN (personal identification number) thereon, and a control code field positioned adjacent the PIN code field and having a control code printed thereon, and a scratch-off layer that covers only the PIN code field to obscure from viewing the PIN code while leaving exposed the control code field.

14. A debit card according to claim 13, wherein said data encoded strip is formed as a magnetic strip.

15. A debit card according to claim 13, wherein said data encoded strip is formed as a label stipe that has been applied in an automated labeling process.

16. A debit card according to claim 13, wherein said scratch-off label strip includes a base label layer that had been removed from a carrier web during an automated labeling process.

17. A debit card according to claim 13, wherein said control code comprises a two-dimensional bar code.

18. A debit card according to claim 13, wherein said control code comprises a bar code.

19. A debit card according to claim 13, wherein said control code comprises an array of dots.

20. A debit card according to claim 13, wherein said debit card comprises a telephone calling card.

21. A debit card according to claim 13, wherein said debit card comprises a credit card.

22. A method of applying a PIN (personal identification number) and control code onto a debit card comprising the steps of:
supplying a batch of rectangular configured, planar card members that are wallet sized and have front and rear surfaces;
drawing in succession a single card at a time in vertical orientation from the batch into a belt delivery system;
rotating the card 90 degrees to lay the card flat, and while the card is flat;
feeding the card into a labeling station; and
at the labeling station, adhering a scratch-off label strip onto the rear surface of the planar card member, said scratch-off label strip having opposing sides, one side having a self-adhesive positioned thereon that removably adheres the scratch-off label onto the planar card member during labeling, the other side having a PIN code field containing a printed PIN (personal identification number) thereon, and a control code field positioned adjacent the PIN code field and having a control code printed thereon, and a scratch-off layer that covers only the PIN code field to obscure from viewing the PIN code, while leaving exposed the control code field.

23. A method according to claim 22, wherein said scratch-off label strip includes a base label layer, and separating the base label layer from a carrier web during the labeling process.

24. A method according to claim 22, wherein said control code further comprises a two-dimensional bar code.

25. A method according to claim 22, wherein said control code further comprises bar code.

26. A method according to claim 22, wherein soa control code further comprises an array of dots.

27. A method according to claim 22, and further comprising a data encoded strip positioned on the rear surface.

28. A method of applying a PIN (personal identification number) and control code onto a debit card that is part of a card carrier comprising the steps of:
supplying a batch of planar card carrier members that contain at least one wallet sized planar card members and have front and rear surfaces;
drawing in succession a single card carrier member at a time in vertical orientation from the batch into a belt delivery system;
rotating the card carrier member 90 degrees to lay the card carrier member flat, and while the card carrier member is flat;
feeding the card carrier member into a labeling station; and
at the labeling station, adhering a scratch-off label strip onto the rear surface of the planar card member that is contained in the card carrier member, said scratch-off label strip having opposing sides, one side having a self-adhesive positioned thereon that removably adheres the scratch-off label onto the planar card member during labeling, the other side having a PIN code field containing a printed PIN (personal identification number) thereon, and a control code field positioned adjacent the PIN code field and having a control code printed thereon, and a scratch-off layer that covers only the PIN code field to obscure from viewing the PIN code, while leaving exposed the control code field.

29. A method according to claim 28, wherein said scratch-off label strip includes a base label layer, and separating the base label layer from a carrier web during the labeling process.

30. A method according to claim 28, wherein said control code further comprises a two-dimensional bar code.

31. A method according to claim 28, wherein said control code further comprises bar code.

32. A method according to claim 28, wherein soa control code further comprises an array of dots.

33. A method according to claim 28, and further comprising a data encoded strip positioned on the rear surface.

34. A method according to claim 28, and further comprising the step of separating the planar card member from the card carrier member by breaking perforations on the card carrier member to separate the planar card member from the card carrier member.

* * * * *

UNITED STATES PATENT AND TRADEMARK OFFICE
CERTIFICATE OF CORRECTION

PATENT NO. : 6,199,757 B1  
DATED : March 13, 2001  
INVENTOR(S) : Kubert

Page 1 of 1

It is certified that error appears in the above-identified patent and that said Letters Patent is hereby corrected as shown below:

Column 11,  
Line 7, delete "stipe" substitute -- stripe --  
Line 39, delete "stipe" substitute -- stripe --

Column 12,  
Line 19, delete "soa" substitute -- said --  
Line 57, delete "soa" substitute -- said --

Signed and Sealed this

Eleventh Day of December, 2001

Attest:

NICHOLAS P. GODICI  
Attesting Officer  
Acting Director of the United States Patent and Trademark Office